(12) United States Patent
Kreiner et al.

(10) Patent No.: US 9,241,143 B2
(45) Date of Patent: Jan. 19, 2016

(54) OUTPUT CORRECTION FOR VISUAL PROJECTION DEVICES

(75) Inventors: Barrett Kreiner, Woodstock, GA (US); Jonathan Reeves, Roswell, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1937 days.

(21) Appl. No.: 12/021,620

(22) Filed: Jan. 29, 2008

(65) Prior Publication Data

US 2009/0190046 A1 Jul. 30, 2009

(51) Int. Cl.
*H04N 9/31* (2006.01)
*H04N 5/74* (2006.01)
*H04N 13/04* (2006.01)

(52) U.S. Cl.
CPC ............... *H04N 9/3147* (2013.01); *H04N 5/74* (2013.01); *H04N 9/31* (2013.01); *H04N 9/3176* (2013.01); *H04N 9/3182* (2013.01); *H04N 9/3185* (2013.01); *H04N 9/3197* (2013.01); *H04N 13/0459* (2013.01)

(58) Field of Classification Search
CPC ..... H04N 9/3147; H04N 9/3185; H04N 5/74; H04N 13/0459
USPC .......................................... 348/187–188, 744
See application file for complete search history.

(56) References Cited

U.S. PATENT DOCUMENTS

| | | | |
|---|---|---|---|
| 4,519,694 A | 5/1985 | Kashiwagi et al. | |
| 6,597,410 B1 * | 7/2003 | Doany et al. | 348/744 |
| 6,784,977 B2 | 8/2004 | von Bunau et al. | |
| 6,945,653 B2 * | 9/2005 | Kobori et al. | 353/30 |
| 6,984,039 B2 * | 1/2006 | Agostinelli | 353/28 |
| 7,224,849 B2 | 5/2007 | Bernardi et al. | |
| 7,813,578 B2 * | 10/2010 | Park et al. | 382/254 |
| 8,643,792 B2 * | 2/2014 | McDowall et al. | 348/745 |
| 8,768,094 B2 * | 7/2014 | Bassi et al. | 382/275 |
| 2002/0024640 A1 | 2/2002 | Ioka | |
| 2002/0149613 A1 * | 10/2002 | Gutta et al. | 345/728 |
| 2003/0002023 A1 | 1/2003 | Bunau et al. | |
| 2004/0156080 A1 | 8/2004 | Bernardi et al. | |
| 2004/0160581 A1 * | 8/2004 | Parker et al. | 353/122 |
| 2005/0134599 A1 * | 6/2005 | Nayar et al. | 345/589 |

(Continued)

OTHER PUBLICATIONS

Bimber et al., Embedded Entertainment with Smart Projectors, Jan. 2005, IEEE Computer, pp. 48-55.*

(Continued)

*Primary Examiner* — Ricky Chin
(74) *Attorney, Agent, or Firm* — Scott P. Zimmerman, PLLC

(57) ABSTRACT

Dedicated projectors and devices with projection abilities such as digital cameras or camcorders have projections that are corrected to compensate for irregularities in the surfaces receiving the projection. The image data being projected is compensated to account for the irregularities by observing the irregularities with a camera to produce image data and creating the compensation based on that image data. Irregularities of the projection receiving location including angular relationships to the projector causing keystoning, noisy surfaces with reflectivity or absorption, color patterns, non-planar regions, intervening objects, and the like may be accounted for during the compensation. The projection of the image itself may be utilized to capture the result of projecting onto the irregularities. Projection of target grids, such as using infrared, may be used to capture the result of projecting onto the irregularities. The captured image may be processed to produce a compensated image to be projected.

11 Claims, 8 Drawing Sheets

(56) References Cited

U.S. PATENT DOCUMENTS

| | | | |
|---|---|---|---|
| 2005/0254726 A1* | 11/2005 | Fuchs et al. | 382/285 |
| 2005/0270492 A1* | 12/2005 | Vlahos | 353/30 |
| 2007/0183017 A1 | 8/2007 | Hembd | |
| 2008/0068578 A1 | 3/2008 | Sakumichi | |
| 2008/0095468 A1* | 4/2008 | Klemmer et al. | 382/285 |
| 2008/0136976 A1* | 6/2008 | Ajito et al. | 348/745 |
| 2008/0143581 A1 | 6/2008 | Kreiner et al. | |
| 2008/0158440 A1* | 7/2008 | Belliveau | 348/744 |
| 2009/0067749 A1* | 3/2009 | Schiewe et al. | 382/294 |
| 2010/0033691 A1 | 2/2010 | Hung et al. | |
| 2010/0182416 A1* | 7/2010 | Holmgren et al. | 348/77 |
| 2010/0201893 A1* | 8/2010 | Pryor | 348/744 |

OTHER PUBLICATIONS

Postle, Bruno, Hugin Tutorial—Perspective Correction. Jul. 2005. http://www.hugin.sourceforge.net/tutorials/perspective/en.shtml.

Sukthankar, Rahul, et al., Smarter Presentations: Exploiting Homography in Camera-Projector Systems, Proceedings of Internation Conference on Computer Vision, 2001.

* cited by examiner

OUTPUT CORRECTION FOR VISUAL PROJECTION DEVICES

TECHNICAL FIELD

Embodiments are related to the projection of visual displays. More particularly, embodiments are related to correcting the output of projection devices.

BACKGROUND

Projectors project a visual image onto a surface, typically a projector screen that provides a nearly ideal projection receiving surface. The projector screen typically has a plane white color, a suitable reflectivity for viewing the projected image when dim room lighting is present, and is a flat vertical surface that does not distort the projected image so long as the projector is properly aligned. However, it is not always possible to ideally position the projector, and at times, improper alignment occurs and distortion such as keystoning results. Another drawback occurs when a presenter or other object is present between the projector and the projection screen. The projection is distorted at the point where the projection output reaches the person or object rather than the projector screen. Furthermore, the projection is bothersome to the person when facing the projector.

With projection devices being miniaturized and/or combined with other devices, such as placing projectors within digital cameras, camcorders, cell phones, and other portable digital devices so that individuals can easily share images, the need to project an image may arise at any time and place. Therefore, the surface to receive the projection output may be anything from a table top to a person's clothing. Thus, the surface receiving the projection output may be far from the ideal of the projector screen. Therefore, the resulting image appearing on the surface receiving the projection output may be distorted in many ways, due to non-planar surfaces, dynamic surfaces, oddly colored and/or textured surfaces, and so forth. Furthermore, the alignment of the projection output to the surface may be angular and result in keystoning. In these situations, the appearance of the projected image may be less than desirable.

SUMMARY

Embodiments address issues such as these and others by providing correction of the projection output by capturing images of the surface receiving the projection. The captured images may be captures of the desired image being projected onto the surface to reveal the distortions produced by the irregularities of the surface. The captured images may alternatively be captures of a target such as an infrared grid that reveal the distortions produced by the irregularities. The captured images are then used to calculate corrections to be applied to the image data that will compensate for the irregularities of the projection receiving surface.

Embodiments provide a device that includes a housing and a projection output within the housing producing a projected output that extends to a first position beyond the housing. The device includes a camera within the housing that has a fixed relationship relative to the projection output and that captures an image from the first position. The device further includes a processor within the housing and in communication with the projection output and the camera. The processor provides a source image to the projection output, receives the captured image from the camera, and compares the captured image relative to the source image in relation to the fixed relationship between the camera and the projection output to determine at least one difference. The processor also creates an image based on the at least one difference, and provides the created image to the projection output in placed of the source image.

Embodiments provide a computer readable medium containing instructions that perform acts that include projecting a reference target onto a first location. The acts further include capturing image data of the first location while the target is being projected onto the first location and comparing the captured image data to the reference target to detect at least one difference. The acts also include generating compensation data based on the at least one difference, applying the compensation data to image data to produce compensated image data, and projecting a compensated image corresponding to the compensated image data onto the first location.

Embodiments provide a method of projecting an image that involves obtaining reference image data and producing a reference display signal from the reference image data, where the reference display signal is projected onto a first location, the first location being a dynamic surface. The method involves capturing first image data of the first location while the reference display signal is being projected onto the first location while the first location is in a first state. The method involves comparing the captured first image data to the reference image data to detect at least one first difference, generating first compensation data based on the at least one first difference, and applying the first compensation data to the reference image data to produce compensated first image data. The method involves producing a first compensated display signal from the compensated image data, the first compensated display signal being projected onto the first location. The method involves capturing second image data of the first location while the first compensated display signal is being projected onto the first location while the first location is in a second state different than the first state. The method involves comparing the captured second image data to the reference image data to detect at least one second difference, generating second compensation data based on the at least one second difference, and applying the second compensation data to the reference image data to produce compensated second image data. The method further involves producing a second compensated display signal from the compensated second image data, the second compensated display signal being projected onto the first location.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Embodiments provide for the correction of projection outputs to compensate for irregularities in the surface(s) receiving the projected image. An image of the surface is captured, where a projected image or target is present on the surface. From the image of the projected image or target appearing on the surface, compensation for the surface can be calculated and applied to the image data. The compensation allows the image data to be manipulated such that when projected onto the surface, the effects of the irregularities in the surface are decreased or otherwise changed.

Figure 1:
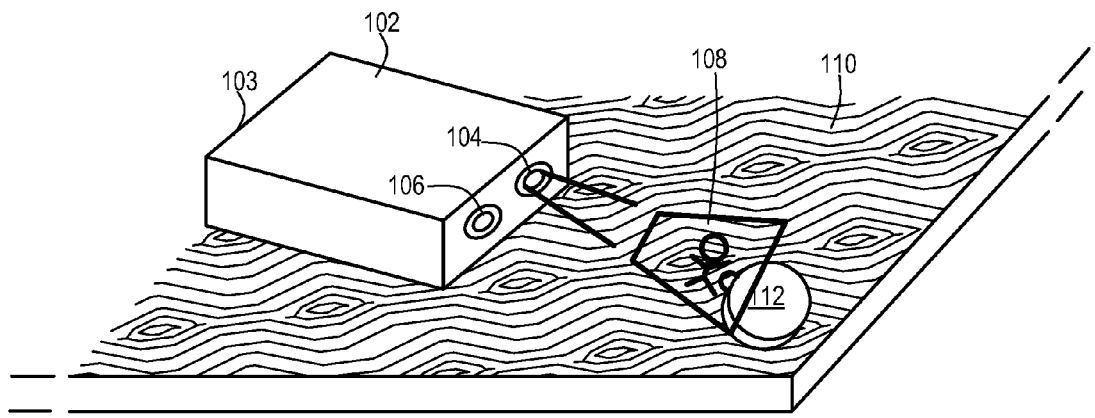
FIG. 1 shows a device according to various embodiments projecting an image onto a surface having irregularities that distort the projected image.

FIG. 1 shows an example of a device 102 according to various embodiments. The device 102 may be a portable digital device, such as a digital camera, digital camcorder, mobile telephone, personal digital assistant, and the like. The device 102 may alternatively be a dedicated projection device, such as a full scale projector.

The device 102 includes a housing 103 within which sub-devices are present. The sub-devices may include a camera 106 as well as a projection output 104. As shown in this example, the projection output 104 is projecting an image 108 onto a table top 110. As the projection output 104 is projecting at an angle relative to the table top 110, the projected image 108 is keystoned. Furthermore, the projected image 108 partially overlaps with a coin 112 also sitting on the table top 110 which presents an additional distortion. In addition to that, the table top 110 has a prominent surface ornamentation such as wood grain or other streaks that pass through the location where the projected image 108 appears so as to further distort the projected image 108.

According to exemplary embodiments, the camera 106 captures an image of the same location where the projection output 104 is directed. The camera 106 maintains a fixed relation to the projection output 104 within the housing 103 such that the images produced from the camera 106 have an expected format. For example, the camera 106 may experience nearly the same amount of keystone as the projection output 104 but in reverse, so that if the projection image 108 is keystoned, it appears less keystoned to the camera 106. Therefore, as discussed below the device 102 may apply this known condition when analyzing the image captured by the camera 106 relative to the reference image being sent to the projection output 104.

For example, to eliminate keystoning of the projection image 108 from a vantage point directly over the image 108 may call for a predefined amount of keystoning to appear in the image that is captured by the camera 106 where the camera 106 has a vantage point other than directly over the image being projected. Because the camera relationship 106 is known relative to the position of the projection output 104, the amount of keystoning present in the camera image for an image that is actually not keystoned when viewed from directly above can be defined within keystone removal logic of the device 102. While the device 102 may be calibrated for removing keystoning for other vantage points, the vantage point directly over the image may be a common choice for calibration because that mimics the appearance of an actual photograph lying on the table top 110. In other words, individuals may expect there to be some naturally occurring keystone when viewing the image from an angle but may expect there to be no keystone when viewing the image directly from above.

Furthermore, the image captured by the camera 106 shows a shift in the image due to the vertical change in the surface resulting from the coin 112. Upon correcting the keystone of the projection output and accounting for the known keystone of the camera 106, a pixel by pixel overlay of the captured image relative to the reference image may be done in memory of the device 102 to perceive the shift. The reverse of the shift may then be computed. As discussed above, different reference vantage points may be used to calibrate the correction for such a shift. For example, from a vantage point directly over the image, the shift may be less than as perceived by the camera 106, such that the compensation is calibrated to correct for the shift by an amount less than is necessary to eliminate the shift from the perspective of the camera 106.

In addition to correcting for such shifts due to variation in the plane of the projection receiving surface, the device 102 may also compensate for the grain or other streaks present on the table top 110 that appear within the project image 108. Upon creating the pixel by pixel overlay in memory between the image captured by the camera 106 and the reference image being projected, the device 102 may also account for differences in the intensity, color, hue, and other visual characteristics at each pixel. Thus, if a pixel that should be blue appears green, then it can be computed that a yellow contribution is coming from a background at the point where that pixel appears.

Compensation may be computed to adjust the pixel color being output so that when that pixel color appears on the background that is providing the yellow contribution, it appears bluer and less green. While the precise colors of the reference image may not always be possible on a background surface of colors other than white, this pixel by pixel approach may bring the colors closer to those that are present in the actual image data and may also improve upon the consistency of the colors of a compensated projected image 108'. So, for example, if the blue discussed above is a different shade than a blue of the actual image, the blue of the compensated image may be very close to other areas of the image containing that blue and may also be closer to the blue of the actual image than to the unintended green that initially appeared at that pixel location.

Rather than capture the projected image 108 with the camera 106, the device may alternatively project a target grid onto the location where the projection image 108 is directed. Target grids are used for auto-focusing purposes with conventional cameras. As one example, two slightly offset fixed pattern emitters, using infrared, visible light, or other spectrum, may be provided to project a target grid, one emitter projecting a '=' pattern and the other emitter projecting a '||' pattern. The image returned from a flat surface would be like a tic-tac-toe pattern, but at angles, the distortion of the lines relative to each other, and the shadows and other visual cues will allows a surface map to be quickly perceived by the device 102. As another example, a single emitter may be used to project the same or similar patterns such as the '+' pattern as shown below in FIG. 7B.

This target grid may be projected and captured by the camera 106 to compute corrections for keystone, shifts in the surface, variations in depth of the field of view, and so forth by determining differences in the reference grid relative to the captured grid. This target grid may be projected by a target grid source before the projection image 108 is projected so as to determine the compensation before presentation of the image begins. Alternatively, the target grid may be projected at the same time as the image 108. In this latter case, the target grid may be projected using invisible wavelengths such as infrared light that the camera 106 is capable of capturing so that the audience does not see the target grid during the presentation.

Figure 2:
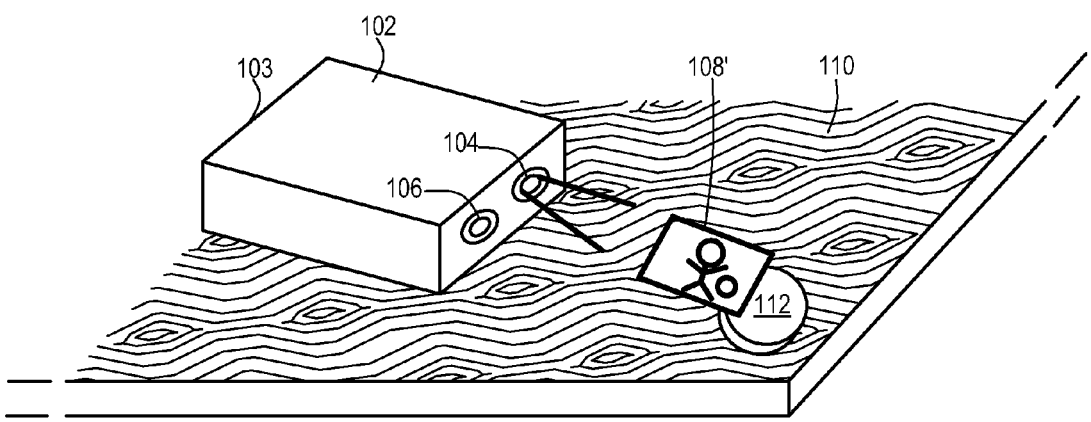
FIG. 2 shows a device according to various embodiments projecting an image onto a surface having irregularities where the image is compensated to reduce the effect of the irregularities.

In FIG. 2, the exemplary device 102 has applied the projection output corrections discussed above according to various embodiments. Here, the device 102 projects the compensated projection image 108' onto the same location where the uncompensated projected image 108 was projected. The effects of keystone, shifts, and streaks have been reduced so that the compensated projection image 108' more closely resembles a photograph, or a projection onto a more regular projection surface.

Figure 3:
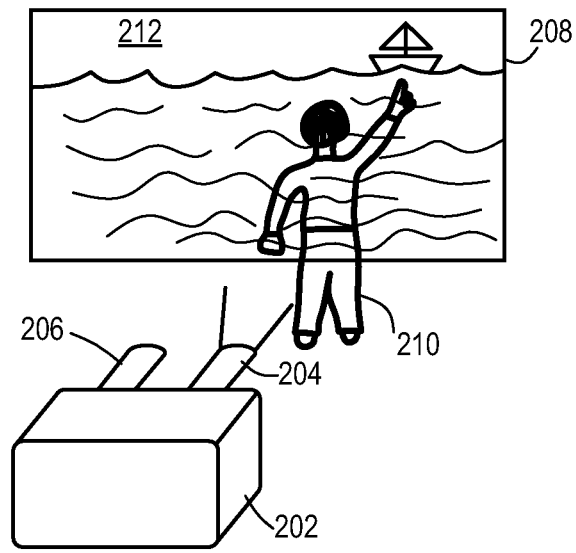
FIG. 3 shows a device according to various embodiments projecting an image onto a surface having a person between the projector and the surface where the person distorts the projected image.

FIG. 3 shows an example where a projection device 202 is being used to create a larger projection onto a wall 208 or even onto a projection screen. The projection device 202 of this example may take many forms, such as the personal digital devices discussed above or a full scale projector. Here a person 210 is present between a projection output 204 of the device 202 and the wall 208 where a projected image 212 is appearing. This is often the case during a presentation, such as where the person 210 interacts with the image 212 or merely walks by the wall 208. Portions of the projected image 212 appear on the person 210, which distorts the appearance of the projected image 212. Furthermore, when the person 210 faces the audience and the projection output 204, the light from the projection output 204 shines onto the face and eyes of the person 210, which results in discomfort.

According to exemplary embodiments, the device 202 includes a camera 206 that captures the projected image 212 so that the captured image can be compared to the reference image to find distortions and compensate for them. Using techniques discussed above, the device 202 may attempt to modify the image to account for the change in depth of the field where the person 212 is present and to account for the variation in colors, intensities, and the like due to the colors and textures of the person's clothing, skin, and hair. This may be done by capturing the projected image 212 with the camera 206. Alternatively, some of this distortion may be captured by a target grid being projected and captured for analysis, such as any keystone and any variation in the depth of the field.

Figure 4:
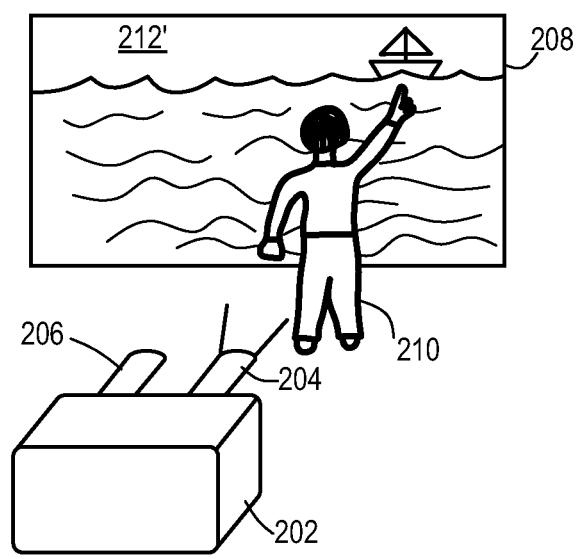
FIG. 4 shows a device according to various embodiments projecting an image onto a surface having a person between the projector and the surface where the image is compensated to reduce the effect of projecting onto the person.

FIG. 4 shows an alternative approach to dealing with the distortion caused by the person 210. Rather than compensating a projected image 212' to try to reduce or eliminate the distortion, it may be desirable to change the distortion. In this case, it may be desirable to project a silhouette of the person 210 in black that overlaps onto the person 210. In that case, to the audience it would appear that the projection is being generated between the person 210 and the wall 208 since the projection image 212' does not appear on the person 210. This may be less distracting for the audience. Another reason to project the silhouette onto the person 210 is so that when the person 210 faces the device 202, no light from the projection output 204 would strike the person's face and eyes so that the person 210 is not discomforted when standing in front of the projected image 212'.

Figure 5:
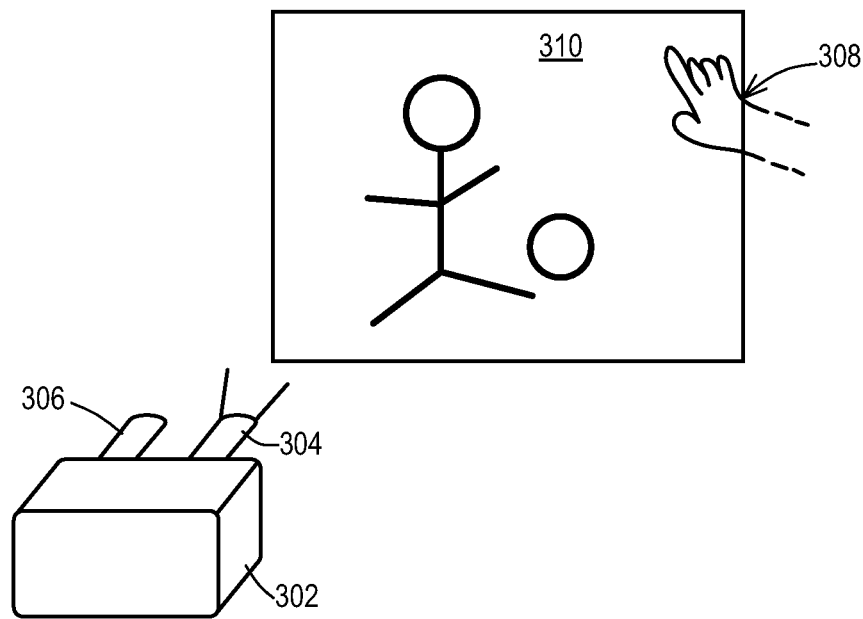
FIG. 5 shows a device according to various embodiments projecting onto a surface having a gesturing hand present between the surface and the projector.

FIG. 5 shows an example of a device 302 where a projection output 304 projects an image 310. A camera 306 is present to capture the image and/or a target grid if present. In order to manipulate the display, a person places a hand 308 into the field of the projection output 304 where the hand can be captured by the camera 306. The hand 308 may gesture in some recognizable manner, such as to point or even move in a pattern. The camera 306 produces an image of the projected image 310 or target grid if present which the device 302 may then analyze. The device 302 recognizes the gesture, either a static hand formation or a hand movement based on multiple frame captures by the camera 306. The device 302 may then implement any image compensation associated with the recognized gesture.

Figure 6:
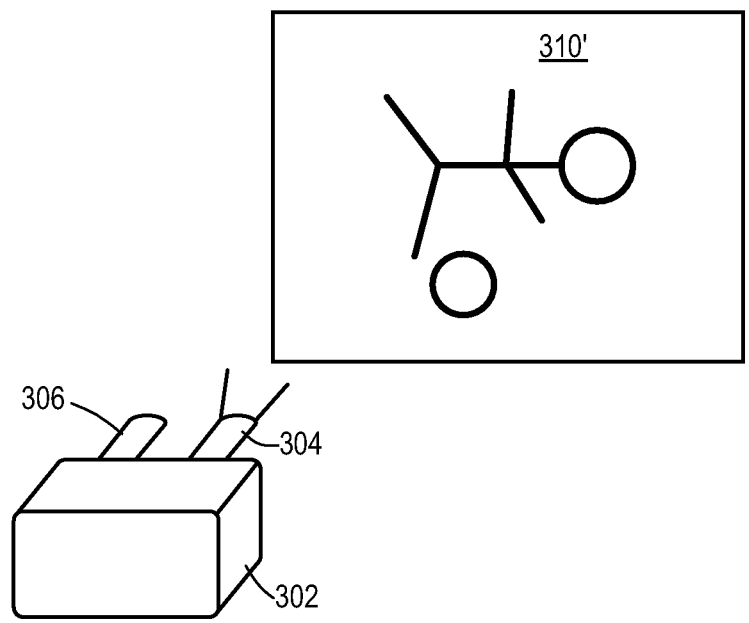
FIG. 6 shows a device according to various embodiments projecting onto a surface after having manipulated an image for projecting the image in accordance with a detected gesture.

FIG. 6 shows that the device 302 has recognized the gesture as being a quarter-clockwise rotation command. As such, the device 302 has projected a rotated image 310' accordingly.

Figure 7A:
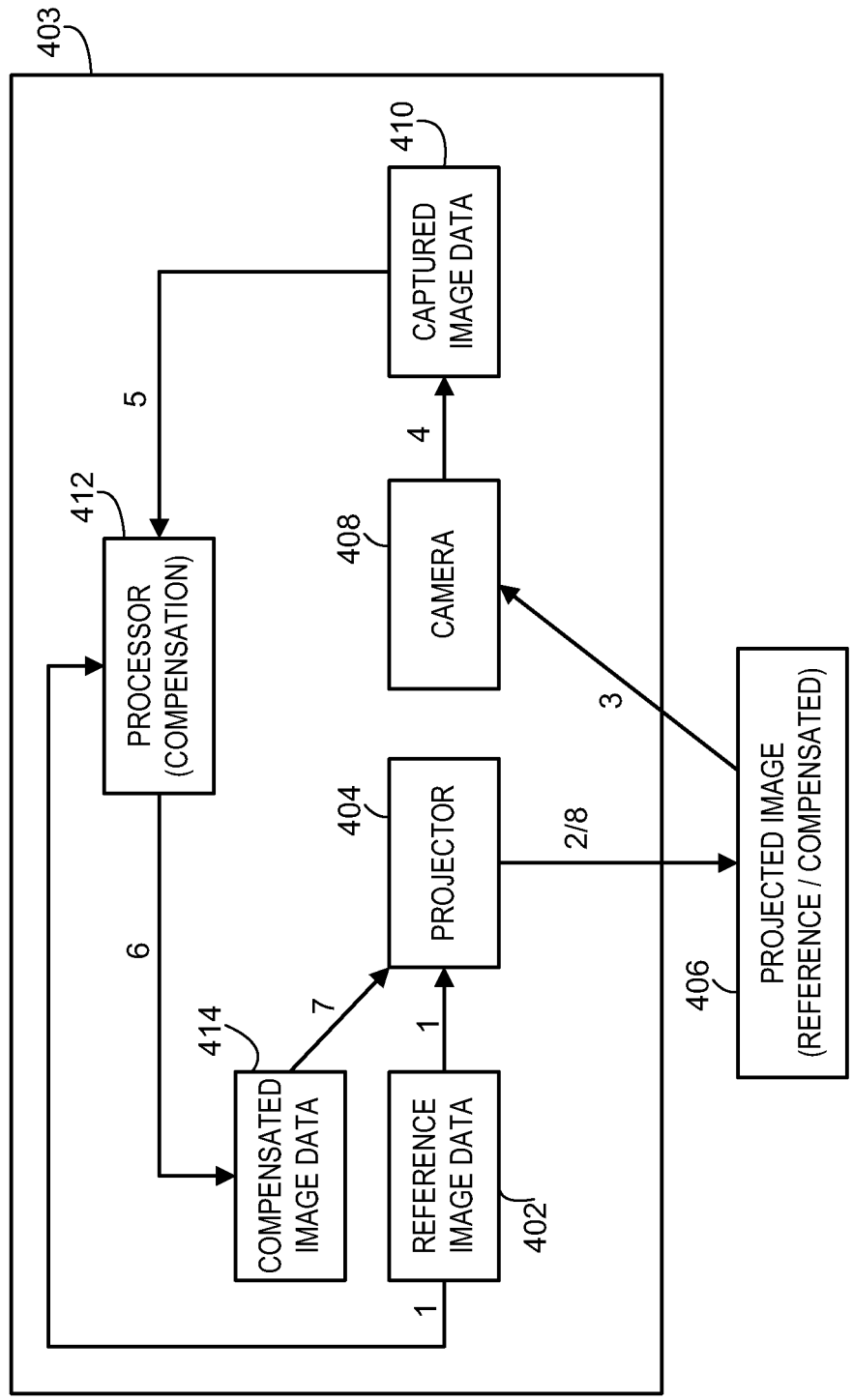
FIG. 7A shows an exemplary configuration of components of a device according to various embodiments where an image is projected and then captured for correction.

FIG. 7A shows components of an exemplary device for projecting a compensated image. The device includes a housing 403 within which the components are located. Many different components may be included depending upon the desired functions of the device. FIG. 7A shows those components used during the projection compensation process, according to exemplary embodiments. However, it will be appreciated that other components may also be included. For example, mobile phone components may be included in addition to those shown.

As shown in FIG. 7A, the reference image data of memory location 402 is provided to a projection output 404 and is accessed by a processor 412. A projected image 406 corresponding to the reference image data 402 appears at the location where the projection output 404 is aimed. A camera 408, also aimed at that location, captures an image of the projected image 406 appearing at the location. The captured image data is stored in a memory location 410 where the captured image data is accessed by the processor 412.

Upon the processor 412 having access to both the reference image data and the captured image data, the processor 412 then computes the corrections to be applied to produce compensated image data, in accordance with exemplary embodiments. The processor 412 provides the compensated image data to a memory location 414. The compensated image data is then provided as a signal to the projection output 404 so that the projected image 406 becomes the compensated image.

It will be appreciated that this feedback loop of the device of FIG. 7A may operate a single time for a given session or may operate continuously. For example, if only those irregularities that will affect every image the same are being corrected and they are static, such as the angular relationship that results in keystoning, then the correction may be computed a single time and applied to different images. However, where the image to be projected changes or where the irregularities of the surface change over time during the session, then the correction may be repeatedly calculated and applied so as to provide different corrections for different images and/or different irregularities of the surface.

The processor 412 may be of various forms such as a general purpose programmable processor, an application specific processor, hardwired digital logic, or various combinations thereof. The processor may implement logical operations to control the projection and capture of images and to compute the corrections to be applied.

The processor 412 and memory constituting the memory locations 402, 410, 414 are examples of a computer readable media which store instructions that when performed implement various logical operations. Such computer readable media may include various storage media including electronic, magnetic, and optical storage. Computer readable media may also include communications media, such as wired and wireless connections used to transfer the instructions or send and receive other data messages.

Figure 7B:
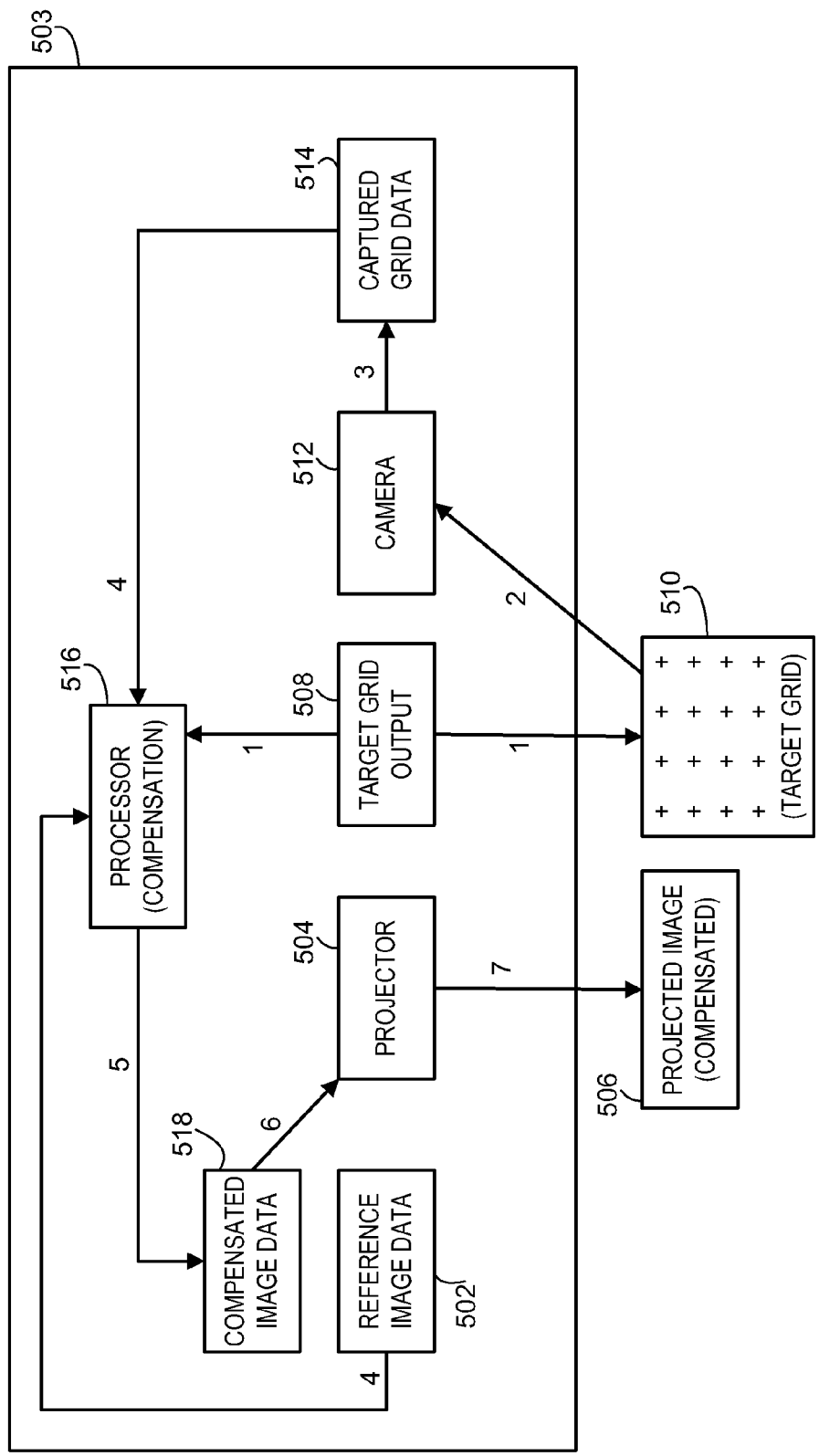
FIG. 7B shows an exemplary configuration of components of a device according to various embodiments where a target is projected and then captured to correct an image.

FIG. 7B shows components of another exemplary device for projecting a compensated image. The device includes a housing 503 within which the components are located. FIG. 7B shows those components used during the projection compensation process, according to exemplary embodiments. However, as with FIG. 7A, it will be appreciated that other components may also be included. For example, mobile phone components may be included in addition to those shown.

As shown in FIG. 7B, a target grid output 508, such as a single or multiple infrared projectors, projects a target grid 510 or other similar target onto a surface that will receive the projection. Data defining the target grid 510 is also accessed by a processor 516. A camera 512 that is aimed at that location where the target grid 510 appears captures an image of the target grid 510 appearing at the location. The captured image data is stored in a memory location 514 where the captured image data is accessed by the processor 516.

Upon the processor 516 also accessing the reference image data from a memory location 502, the processor 516 then computes the corrections to be applied to produce compensated image data, in accordance with exemplary embodiments. The processor 516 provides the compensated image data to a memory location 518. The compensated image data is then provided to a projection output 504 so that a projected image 506 is the compensated image. The target grid 510 is shown as being projected at a location other than the location of the projected image 506 for clarity of illustration. It will be appreciated that the target grid 510 may be projected onto the same location where the projected image 506 will be or is being projected. As discussed above, the target grid 510 may be projected in infrared so that the target grid 510 may not be visible to an audience viewing the projected image 506 even though the target grid 510 is projected onto the same location.

It will be appreciated that this feedback loop of the device of FIG. 7B, like that of FIG. 7A, may operate a single time for a given session or may operate continuously. For example, if only those irregularities that will affect every image the same are being corrected and they are static, such as the angular relationship that results in keystoning, then the correction may be computed a single time and applied to different images. However, where the image to be projected changes or where the irregularities of the surface change over time during the session, then the correction may be repeatedly calculated and applied so as to provide different corrections for different images and/or different irregularities of the surface.

Figure 8:
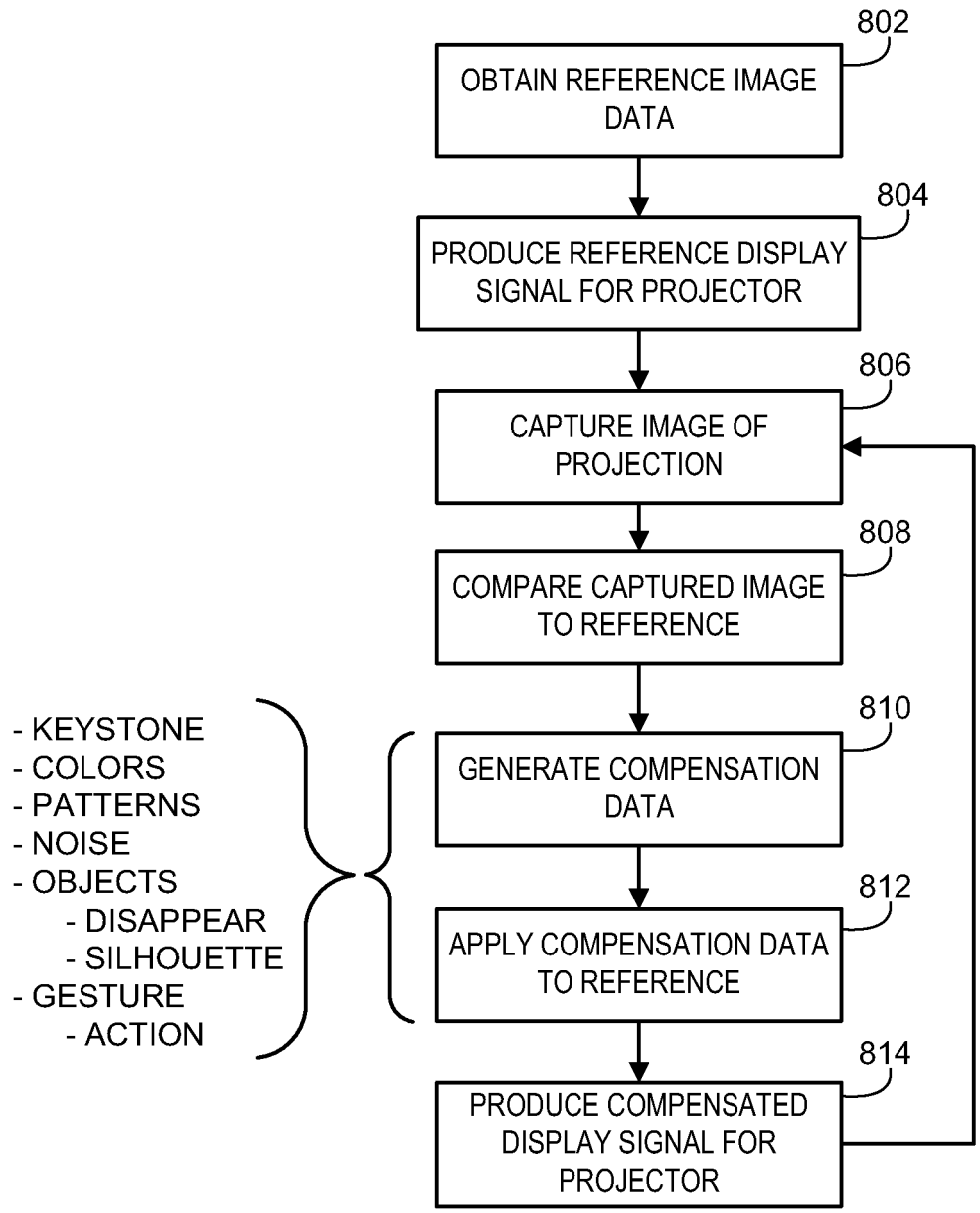
FIG. 8 shows an example of logical operations that may be performed by a device according to various embodiments in order to project an image and capture the image for correction.

The processor 516, like the processor 412 of FIG. 7A, may be of various forms such as a general purpose programmable processor, an application processor, hardwired digital logic, or various combinations thereof. The processor 516 may implement logical operations to control the projection of the image and the target grid, the capture of images, and to compute the corrections to be applied. The processor 516 and memory constituting the memory locations 502, 514, and 518 are also examples of a computer readable media FIG. 8 shows a set of logical operations that may be performed by the processor 412 of FIG. 7A according to various embodiments. The processor 412 obtains the reference image data at an image operation 802. The processor 412 then produces a reference display signal for the projection output 404 at a projection operation 804, such as by interaction with a video adapter that converts the image data to a signal compatible with the projection output 404. The processor 412 may instruct the camera to obtain an image of the projected image appearing at the location at a capture operation 806.

Once the processor 412 has both the reference image and the captured image, the processor 412 then compares the two at a comparison operation 808. Here the processor 412 may factor in any known keystone that the camera perceives when attempting to detect keystoning of the projected image. Likewise, the processor 412 may apply the pixel by pixel comparison here to detect color and intensity differences and the like, to find noise and/or patterns introduced by the surface receiving the projection, to perceive objects between the projection output 404 and the surface, and to recognize objects and gestures.

After determining the distortions present in the captured image, the processor 412 then computes the compensation data at a compensation operation 810. Here the processor 412 determines the manipulations of the reference image data that are necessary so that when projected, the compensated image will more closely match the reference image and/or have different qualities such as containing a silhouette of an intervening person or object or be altered in correspondence with a recognized gesture. The generation of compensation data is discussed below in more detail in relation to FIG. 9.

After having generated the compensation data, the processor 412 then applies that compensation data to the reference image to produce a compensated image data at an application operation 812. The processor 412 then produces a reference display signal for the projection output 404 based on the compensated image data at a projection operation 814.

For embodiments where the compensation is continuous or at least goes through several iterations to increase the accuracy of the corrections, then the logical operations return to again capture an image of the currently corrected image or a next projected image at the capture operation 806. For example, the surface may be in a first state during the current iteration of these logical operations but then change to a second state during a subsequent iteration such that the compensation is different. For example, the coin 112 of FIG. 1 may be removed or the device 102 may be re-positioned between iterations to present a different state of the surface 110. In this next iteration, different image data is captured and different compensation data is produced so that a different compensated image results.

Figure 9:
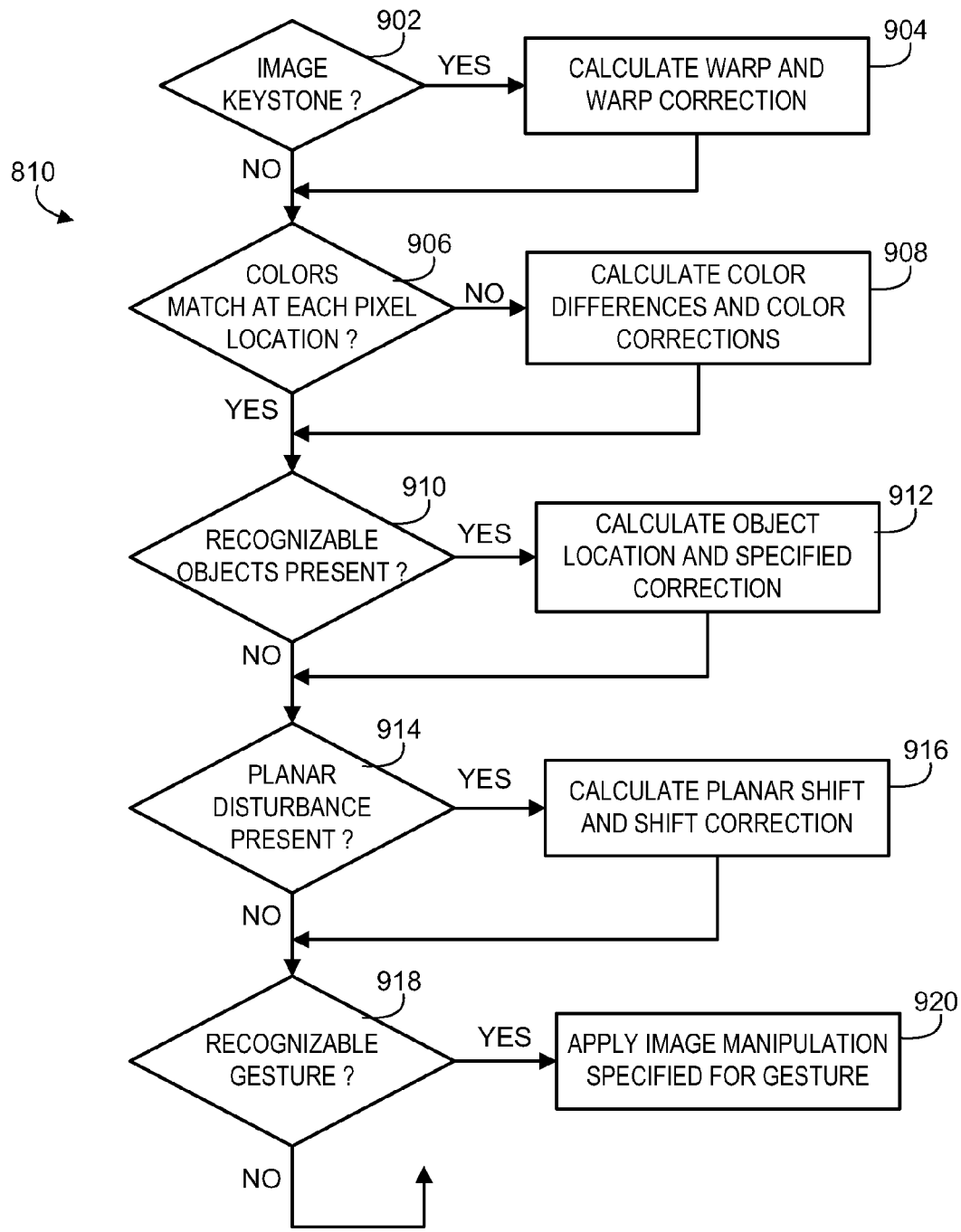
FIG. 9 shows an example of logical operations that may be performed by a device according to various embodiments to implement corrections to an image.

FIG. 9 shows one example of a set of logical operations that correspond to the compensation operation 810 of FIG. 8. The processor 412 may process a series of different corrections for the image. One correction may assist in processing subsequent corrections such that the corrections may be processed sequentially. For example, initially correcting for keystoning may result in a more reliable pixel by pixel comparison when correcting color and intensity distortions in the projected image. FIG. 9 shows one exemplary sequence to the corrections, but it will be appreciated that the sequence may be changed to many different orders of corrections. Furthermore, the processor 412 may calculate one or more corrections contemporaneously rather than sequentially.

At a query operation 902, the processor 412 detects whether the projected image 406 is keystoned. If the projected image 406 is keystoned, then the processor 412 calculates the amount of warp that is present and calculates an amount of compensating warp at a calculation operation 904. Here, the amount of keystone in the captured image that is the result of the camera 408 viewing the projected image 406 at essentially the same angle as the projection output 404 is factored into the calculation of the warp. The warp correction may be calculated to produce a captured image having a keystone that matches the keystone expected to be present due to the angle of the camera 408 to the surface.

If there is no keystone present or after the keystone calculations are complete, the processor 412 then detects whether the colors match at each pixel location at a query operation 906. If the colors do not match at each pixel location, then the processor 412 calculates the color differences and from that calculates the color correction to be applied to negate the color differences at a calculation operation 908.

If there is no color mismatch present or after the color mismatch calculations are complete, the processor 412 then detects whether a recognizable object is present in the field of view captured by the camera 408 at a query operation 910. For example, the processor 412 may recognize a hand or torso of a person based on the distortion that is present in the captured image. The processor 412 may maintain a library of object shapes in memory and associate the shapes with a correction. For example, when a torso is recognized, the correction may be to project a silhouette by utilizing black for those pixels where the torso is present in the captured image. The processor 412 determines the appropriate correction for the recognized object at a calculation operation 912.

If there is no recognized object or after the correction for a recognized object has been completed, the processor 412 then detects whether a planar disturbance is present at a query operation 914. For example, the coin 112 of FIG. 1 presents a planar disturbance. Other planar disturbances might include a surface receiving the projection that is inherently non-planar, such as a convex or concave surface. The processor 412 attempts to correct for the planar disturbance by shifting pixels to create intentional overlaps of pixels or to create intentional empty areas between pixels at a calculation operation 916.

If there is no planar disturbance or after the planar disturbance calculations are complete, the processor 412 then detects whether a recognized gesture is present at a query operation 918. The gesture may be static, such as a certain positioning of a person's fingers, or may be dynamic by movement of a person's hand. Where dynamic, the processor 412 may observe multiple image captures and compare one to the next to detect the motion. The processor 412 may have access to a library of gestures and associated actions to be taken as a correction to the projected image. Upon recognizing a gesture, the processor 412 applies an image manipulation that is associated with the gesture at a calculation operation 920.

Figure 10:
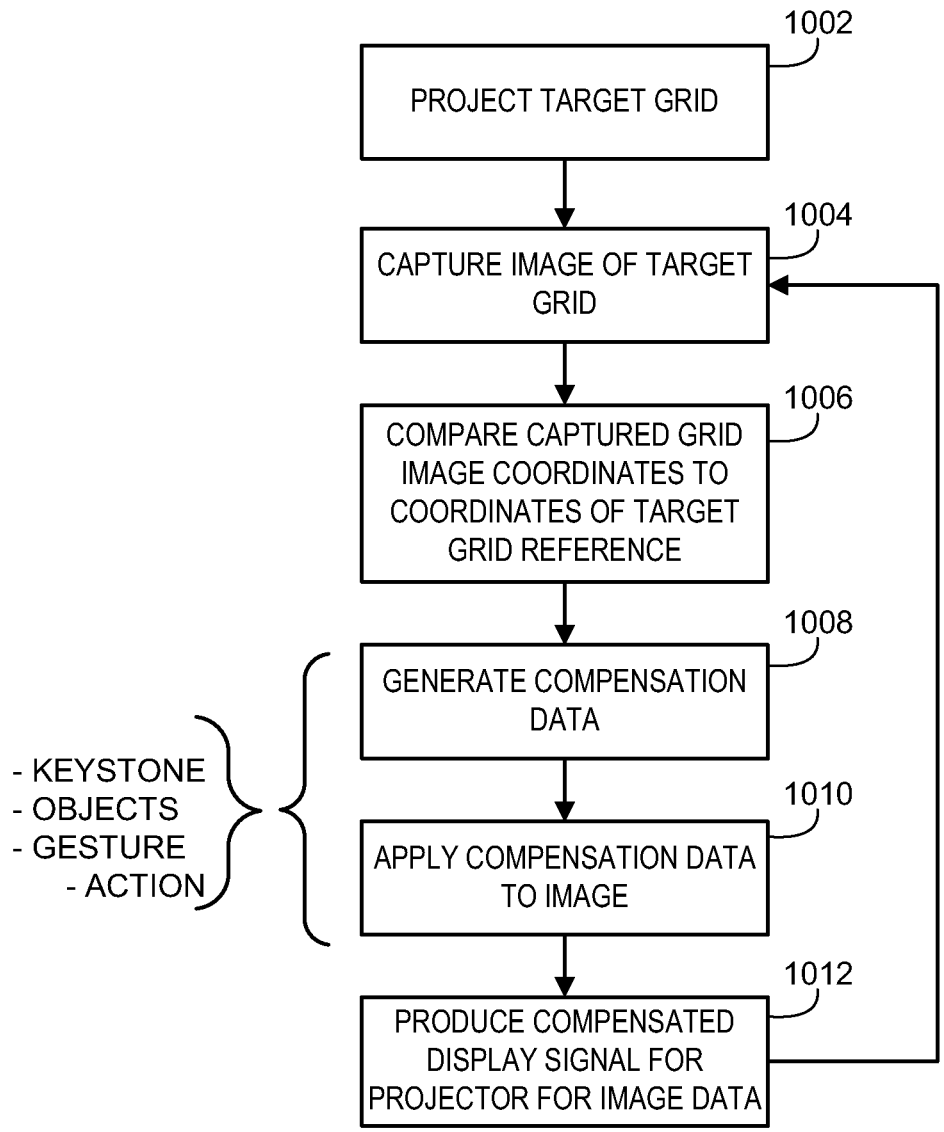
FIG. 10 shows an example of logical operations that may be performed by a device according to various embodiments in order to project a target and capture the target to correct an image.

FIG. 10 shows another set of logical operations that may be performed, but by the processor 516 of FIG. 7B according to various embodiments. The processor 516 instructs the target grid output 508 to project the target grid at a target operation 1002. The processor 516 may then instruct the camera 512 to obtain an image of the target appearing at the location where the projected image is or will be at a capture operation 1004.

The processor 516 has access to the reference target grid being projected and compares the coordinates of the reference target grid to those of the target grid in the captured image at a comparison operation 1006. Thus, rather than doing a pixel by pixel analysis, the processor 516 performs a grid point by grid point analysis of the target grid, where that target grid may have a grid point resolution that is greater than or less than the resolution of the reference image. From this analysis, the processor 516 determines the irregularities present at the surface relative to the perspective of the camera 512.

After having compared the grid points of the target grid, the processor 516 then generates the compensation data needed to account for distortions that are likely to occur in a projected image at a compensation operation 1008. The processor 516 then applies the compensation data to the reference image to be projected at an application operation 1010 to produce a compensated image data. The processor 516 then provides the compensated image data where video hardware produces a corresponding compensated display signal that the projection output 504 projects as the compensated projection image 506 at a calculation operation 1012.

For embodiments where the compensation is continuous or at least goes through several iterations to increase the accuracy of the corrections, then the logical operations return to again capture an image of the target grid at the capture operation 1004. For example, the surface may be in a first state during the current iteration of these logical operations but then change to a second state during a subsequent iteration such that the compensation is different. As in the example discussed above in relation to FIG. 8, the coin 112 of FIG. 1 may be removed or the device 102 may be re-positioned between iterations to present a different state of the surface 110. In this next iteration, different image data is captured and different compensation data is produced so that a different compensated image results.

Thus, by capturing images of the location where images are being or will be projected, compensation for irregularities may be determined and applied. Distortions otherwise caused by irregularities of the surface receiving the projection may be reduced or changed, depending upon what is desired. The projected image may be a better representation of the source image as a result.

While embodiments have been particularly shown and described, it will be understood by those skilled in the art that various other changes in the form and details may be made therein without departing from the spirit and scope of the invention.

What is claimed is:

1. A projector, comprising:
    a projection output to produce a frontal projection of a source image on a screen;
    a camera to capture an image of a reflection from the screen;
    a processor; and
    a memory storing instructions that, when executed by the processor, cause the processor to perform operations, the operations comprising:
    overlaying the image of the reflection onto the source image;
    comparing an overlay of the image of the reflection to the source image;
    determining from the overlay a change in a depth of field;
    inferring, from the change in the depth of field, a presence of a human hand placed between the projection output and the screen;
    recognizing a gesture captured by the camera in the image of the reflection, the gesture performed by the human hand placed into a projection field of the source image, wherein the source image is compensated in response to the gesture;

rotating the source image in response to the gesture performed by the human hand placed into the projection field;

determining a distortion in the image of the reflection caused by the presence of the human hand placed between the projection output and the screen; and projecting a black silhouette from the projection output that overlaps the presence of the human hand in the source image, thus changing the distortion in the image of the reflection.

2. The projector of claim 1, wherein the operations further comprise keystoning the image of the projection.

3. The projector of claim 1, wherein the operations further comprise comparing pixels in the image of the reflection to the pixels in the source image.

4. The projector of claim 1, wherein the operations further comprise calibrating based on a distance between the camera and the screen.

5. A memory device storing instructions that, when executed by a processor, cause the processor to perform operations comprising:

producing, by a projector, a projection of a source image for display on a projection surface;

capturing an image by a camera, the image of a reflection of the projection reflected by the projection surface;

overlaying the image of the reflection onto the source image;

determining a change in a depth of field between the image of the reflection and the source image;

inferring a presence of a human hand placed between the projector and the projection surface;

recognizing a gesture captured by the camera in the image of the reflection, the gesture performed by the human hand placed into a projection field of the source image, wherein the source image is compensated in response to the gesture;

rotating the source image in response to the gesture performed by the human hand placed into the projection field;

determining a distortion of the reflection caused by the presence of the human hand between the projector and the projection surface; and projecting a black silhouette from the projector that overlaps the presence of the human hand in the source image, thus changing the distortion of the reflection caused by the presence of the human hand.

6. The memory device of claim 5, wherein the operations further include keystoning the projection of the source image.

7. The memory device of claim 5, wherein the operations further include comparing pixels in the source image to the pixels in the image.

8. The memory device of claim 5, wherein the operations further include calibrating based on a distance between a camera and the projection surface.

9. A method of projecting images, the method comprising:

generating, by a projector, a frontal projection of a source image onto a projection surface;

capturing, by a camera, an image of a reflection reflected from the projection surface;

overlaying, by a processor operatively coupled to the projector, the image of the reflection onto the source image;

determining, by the processor, a change in a depth of field between the image of the reflection and the source image;

inferring, by the processor, a presence of a human hand placed between the projector and the projection surface from the change in the depth of field;

recognizing, by the processor, a gesture in the image of the reflection, the gesture performed by the human hand, wherein the source image is compensated in response to the gesture;

rotating, by the processor, the source image in response to the gesture performed by the human hand placed into the projection field;

determining, by the processor, a distortion in the image of the reflection caused by the presence of the human hand placed between the projector and the projection surface; and projecting, by the projector, a black silhouette that overlaps the presence of the human hand in the source image.

10. The method of claim 9, further comprising reducing the distortion based on a distance between the camera and the projection surface.

11. The method of claim 9, further comprising comparing pixels to determine the change in the depth of field.

* * * * *